(12) United States Patent
Tsukahara et al.

(10) Patent No.: US 6,984,098 B2
(45) Date of Patent: Jan. 10, 2006

(54) STACKER FOR PLATE MEMBERS, METHOD FOR STACKING PLATE MEMBERS, AND STACKED PLATE MEMBERS

(75) Inventors: Masayuki Tsukahara, Tokyo (JP); Morio Kiryu, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/472,199

(22) PCT Filed: Mar. 14, 2002

(86) PCT No.: PCT/JP02/02401

§ 371 (c)(1), (2), (4) Date: Feb. 13, 2004

(87) PCT Pub. No.: WO02/079064

PCT Pub. Date: Oct. 10, 2002

(65) Prior Publication Data

US 2004/0146392 A1    Jul. 29, 2004

Related U.S. Application Data

(60) Provisional application No. 60/302,688, filed on Jul. 5, 2001.

(30) Foreign Application Priority Data

Mar. 28, 2001    (JP)    .............................. 2001-092361

(51) Int. Cl.
  *B65G 57/03*    (2006.01)
  *B65H 29/26*    (2006.01)
  *B65H 3/00*    (2006.01)

(52) U.S. Cl. .............................. 414/794.2; 414/794.6; 414/797.7; 414/795.1

(58) Field of Classification Search ............. 414/794.2, 414/794.6, 794.7, 790.4, 797.7, 788.4, 795.1
See application file for complete search history.

(56) References Cited

U.S. PATENT DOCUMENTS

| 3,135,175 | A |   | 6/1964 | Dexter |
| 4,943,207 | A |   | 7/1990 | Provan et al. |
| 4,955,794 | A | * | 9/1990 | Fluck ...................... 414/790.4 |

(Continued)

FOREIGN PATENT DOCUMENTS

DE    1 209 573    1/1966

(Continued)

OTHER PUBLICATIONS

Zhiguo Fang, et al., "Machine Material Testing", New Science and Technology Publishers Feb. 23, 1985 w/English Translation.

*Primary Examiner*—Gene O. Crawford
(74) *Attorney, Agent, or Firm*—Oblon, Spivak, McClelland, Maier & Neustadt, P.C.

(57) ABSTRACT

A stacker (10) for plate members includes a platform (15) on which plate members (20) are to be stacked and at least one pair of guides (11, 13) disposed at both sides of the platform (15) relative to a transferring direction of the plate members. Each of the guides (11, 13) has a ridge (12a, 14a) spirally formed on a rotational axial portion (12, 14) and a groove (12b, 14b) formed along the ridge (12a, 14a). The aforementioned at least one pair of guides (11, 13) are rotated with opposite edges of the plate member (20) engaged with the grooves (12b, 14b) of the guides (11, 13), to thereby move the plate member (20) toward the platform (15).

24 Claims, 4 Drawing Sheets

U.S. PATENT DOCUMENTS 5,064,093 A    11/1991   Davis et al.
6,443,689 B1 *  9/2002   Reggiani ................ 414/795.6

FOREIGN PATENT DOCUMENTS

| JP | 132361/1986 | 8/1986 |
| JP | 86331/1987 | 6/1987 |
| JP | 64-34851 | 2/1989 |
| JP | 2-134216 | 5/1990 |
| JP | 7-81822 | 3/1995 |
| JP | 8-34521 | 2/1996 |
| JP | 2000-085955 | 3/2000 |
| JP | 2000-313524 | 11/2000 |

* cited by examiner

STACKER FOR PLATE MEMBERS, METHOD FOR STACKING PLATE MEMBERS, AND STACKED PLATE MEMBERS

CROSS REFERENCE TO RELATED APPLICATIONS

This application claims priority to Japanese Patent Application No. 2001-92361 filed on Mar. 28, 2001 and U.S. Provisional Application No. 60/302,688 filed on Jul. 5, 2001, the disclosure of which is incorporated by reference in its entirety.

This application is an application filed under 35 U.S.C. §111(a) claiming the benefit pursuant to 35 U.S.C. §119(e)(1) of the filing date of Provisional Application No. 60/302,688 filed on Jul. 5, 2001 pursuant to 35 U.S.C. §111(b).

TECHNICAL FIELD

The present invention relates to a stacker for plate members, a method for stacking plate members and stacked plate members, more specifically to, a stacker preferably used for stacking plate members, for example, sheared by a flying shear, a method for stacking the plate members and the stacked plate members.

BACKGROUND ART

At an exit side of a flying shear, a stacker is disposed via a transferring apparatus so as to neatly stack plate members each having a predetermined length and sheared by the flying shear.

As this kind of conventional stacker, a stacker that stacks plate members while naturally dropping them or a stacker that stacks plate members while positioning them with a cam driven by an electronically controlled actuator are known.

Now, a plate-shaped inner fin to be disposed in a heat exchanging tube for car air-conditioning evaporators is formed into a thin and wavy cross-section. In cases where these inner fins are stacked by utilizing such a conventional stacker, there are the following problems.

In the former stacker that stacks plate members by naturally dropping them, there is a problem that the inner fin may be deformed by the impact at the time of dropping because the inner fin is thin and therefore easy to be deformed. Furthermore, since the inner fin is thin and that the inner fin is generally made of aluminum or its alloy and therefore very light in weight, the dropping rate is slow, which in turn deteriorates the stacking rate. Furthermore, since the inner fin is made into a wavy cross-section, it is hard to specify the dropping direction thereof, which causes difficulty in neatly arranging them.

On the other hand, in the latter stacker that stacks plate members with a cam, since the inner fin is positioned one by one, the stacking rate is slow. Furthermore, since the inner fin is easily deformed because of the thin thickness, the cam causes a deformation of the inner fin.

Furthermore, it was difficult to neatly stack the inner fins since the inner fins with no oil are hard to slide with each other.

The present invention was made in view of the aforementioned technical background, and aims to provide a stacker capable of moving not only thick plate members but also thin plate members such as inner fins to a stacking position at a high rate without causing any deformation of the plate members, a method of stacking plate members and a stacked plate members stacked by the method.

Other objects and advantages of the present invention will be apparent from the following preferred embodiments.

DISCLOSURE OF INVENTION

According to the first aspect of the present invention, a stacker for plate members includes a platform on which plate members transferred at a predetermined rate are to be stacked, and at least one pair of guides disposed at both sides of the platform relative to a transferring direction of the plate member, each of the guides having a ridge spirally formed on a rotational axial portion and a groove formed along the ridge, wherein the aforementioned at least one pair of guides are rotated with opposite edges of the plate member engaged with the grooves of the guides, to thereby move the plate member toward the platform.

In this stacker, the plate member is transferred between the pair of rotating guides. The side edges of this plate member are received by the grooves of the guides. Accordingly, the side edges of the plate member are supported by the ridges of these guides and positioned relative to the right-and-left direction of the plate member. In this state, in accordance with the rotation of guides, the plate member is moved toward the platform while the side edges of the plate member are being guided by the grooves, to thereby be disposed on the platform or on the upper most plate member disposed on the platform. In this state, since each plate member is positioned relative to the right-and-left direction thereof, plate members are stacked in perfect alignment. Furthermore, during the movement of the plate member toward the platform, side edges of a newly transferred plate member are received by the grooves similarly as mentioned above. This newly transferred plate member is moved toward the platform in accordance with the rotation of the guides. In this way, the side edges of each of newly transferred plate members are received by the grooves one after another, and these plate members are moved toward the platform in accordance with the rotation of each guide to be stacked one on another. As a result, the plate members are stacked at a high rate.

In this stacker, since the plate member is moved by the guides with the side edges supported by the ridges, even in cases where the thickness of the plate member, e.g. an inner fin, is thin, it is possible to move the plate member toward the platform without causing any deformation thereof.

In the aforementioned stacker, it is preferable that the platform is moved in the same direction as a moving direction of the plate member toward the platform at a rate corresponding to a stacking rate of plate members. In this case, the stacking position of the plate member above the platform is kept constant. As a result, even in cases where the thickness of the plate member is thin, it is possible to stack these plate members without causing any deformation thereof. The stacking rate S of the plate members is given by the following equation (i):

$$S = N \times d \quad (i)$$

where S is a stacking rate of the plate members, N is the number of plate members to be stacked per unit time and d is a thickness of the plate member.

Accordingly, the platform is moved at the same rate as the stacking rate S of the plate member.

In the aforementioned stacker, it is preferable that the stacker further includes a stopper for stopping a forward movement of the plate member by coming in contact with a front end portion of the plate member, the stopper being disposed at a front side of the platform. In this case, the front end of the plate member comes in contact with the stopper, resulting in a positioning of the plate member relative to the forward direction. Accordingly, plate members can be stacked in perfect alignment.

It is preferable that one of the pair of guides has a spiral ridge and the other thereof has a reverse spiral ridge and that both of the pair of guides are rotated so that the plate member is transferred forward. In this case, the plate member whose both side edges are received by the grooves is transferred forward. At this time, in cases where a stopper is disposed at the front side of the platform, the front edge of this plate member is pushed against the stopper by receiving the rotational force of the pair of guides. As a result, the positioning of the plate member in the fore-and-aft direction thereof is performed with accuracy. While keeping this positioned state, the plate member is moved toward the platform. Accordingly, the plate members can be stacked in perfect alignment.

It is preferable that a width of a top portion of the ridge is set to be smaller than a width of a basal portion of the ridge. In this case, the side edges of the plate member can be assuredly received by the grooves of the guides.

With the aforementioned stacker, a plate member having a thickness of 0.15 mm or less can be stacked without causing any deformation thereof.

With the aforementioned stacker, even if the plate member has a dented portion and/or a protruded portion at one side or both sides of the plate member, it is possible to stack these plate members.

In the aforementioned stacker, it is preferable that the plate member is transferred to the stacker by a transferring apparatus. In this case, the plate member can be automatically transferred to the stacker, resulting in efficient stacking.

In the aforementioned stacker, it is preferable that the plate member is a member sheared by a flying shear and transferred to the stacker by a transferring apparatus disposed at an exit side of the flying shear. In this case, the plate member sheared by the flying shear can be stacked at a high rate without causing any deformation.

The stacked plate members according to the second aspect of the present invention are stacked by the stacker according to the first aspect of the present. According to the second aspect of the present invention, stacked plate members in perfect alignment can be obtained.

A method for stacking plate members according to the third aspect of the present invention includes the steps of preparing a stacker comprising a platform on which plate members transferred at a predetermined rate are to be stacked, and at least one pair of guides disposed at both sides of the platform relative to a transferring direction of the plate member, each of the guides having a ridge spirally formed on a rotational axial portion and a groove formed along the ridge, and rotating the at least one pair of guides with opposite edges of the plate member engaged with the grooves of corresponding guides, to thereby move the plate member toward the platform.

In the method of stacking plate members, it is preferable that the platform is moved in the same direction as a moving direction of the plate member toward the platform at a rate corresponding to a stacking rate of plate members. In this case, the plate members can be stacked without causing any deformation.

In the method of stacking plate members, it is preferable that the forward movement of the plate member is stopped by a stopper disposed at a front side of the platform. In this case, the plate members can be stacked in perfect alignment.

It is preferable that one of the pair of guides has a spiral ridge and the other thereof has a reverse spiral ridge and that the pair of guides are rotated so that the plate member is transferred forward. In this case, the plate members can be stacked in perfect alignment.

It is preferable that a width of a top portion of the ridge is set to be smaller than a width of a basal portion of the ridge. In this case, the side edges of the plate member are received by the grooves of the guides assuredly.

According to the method of stacking plate members, even if the plate member is 0.15 mm or less in thickness, it is possible to stack these plate members without causing any deformation.

According to the method of stacking plate member, even if the plate member has a dented portion and/or a protruded portion at one side or both sides of the plate member, it is possible to stack these plate members assuredly.

In the method of stacking plate members, it is preferable that the plate member is transferred to the stacker by a transferring apparatus. In this case, the transferring of the plate member to the stacker is automatically performed, resulting in efficient stacking.

It is preferable that the plate member is a member sheared by a flying shear and transferred to the stacker by a transferring apparatus disposed at an exit side of the flying shear. In this case, it is possible to stack the sheared plate members sheared by a flying shear.

The stacked plate members according to the fourth aspect of the present invention are stacked by the method according to the third aspect of the present invention. According to the fourth aspect of the present invention, the stacked plate members in perfect alignment can be obtained.

BEST MODE FOR CARRYING OUT THE INVENTION

The present invention will be described with reference to the attached drawings.

Figure 1:
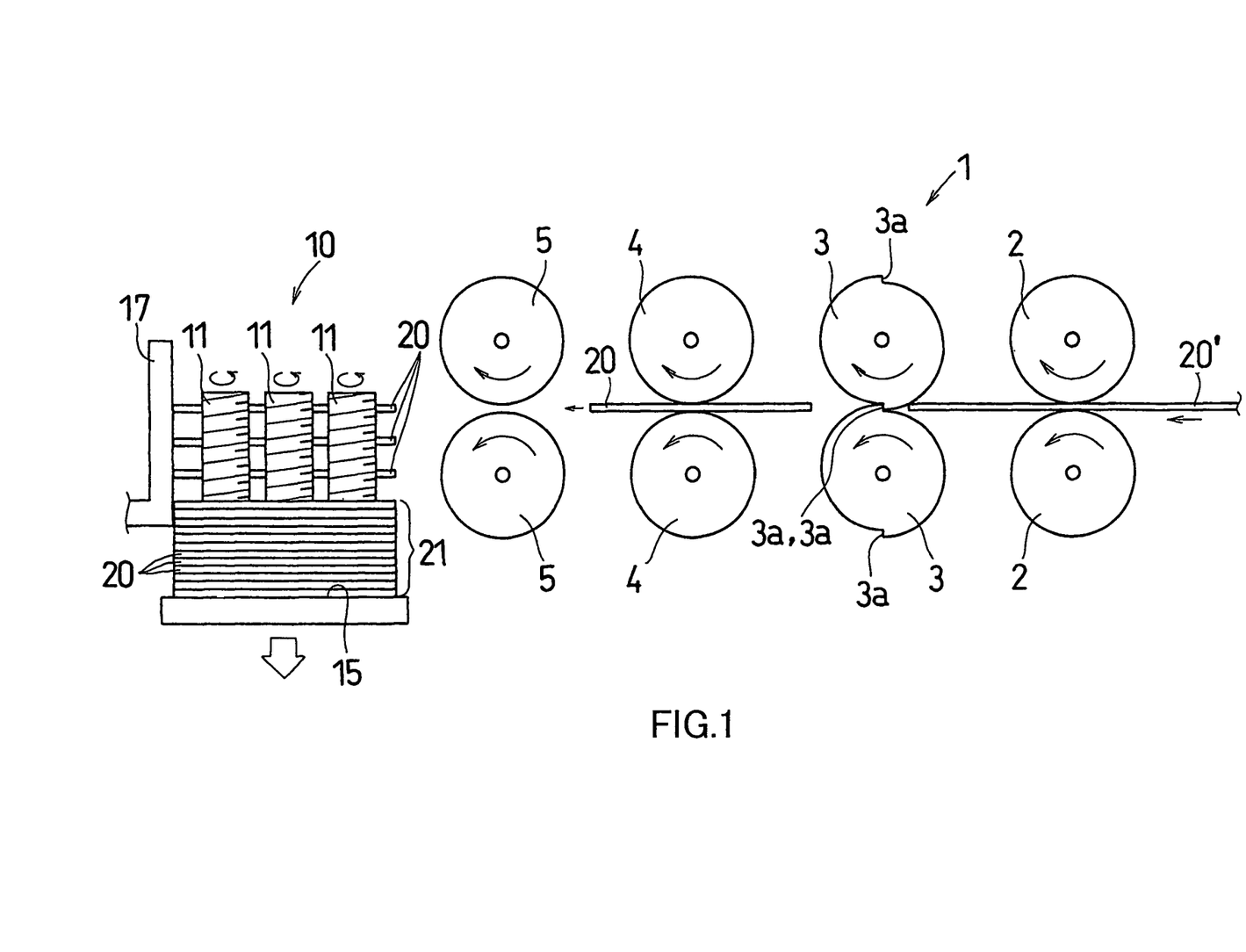
FIG. 1 is a side view showing a stacker for plate members according to an embodiment of the present invention.
Figure 2:
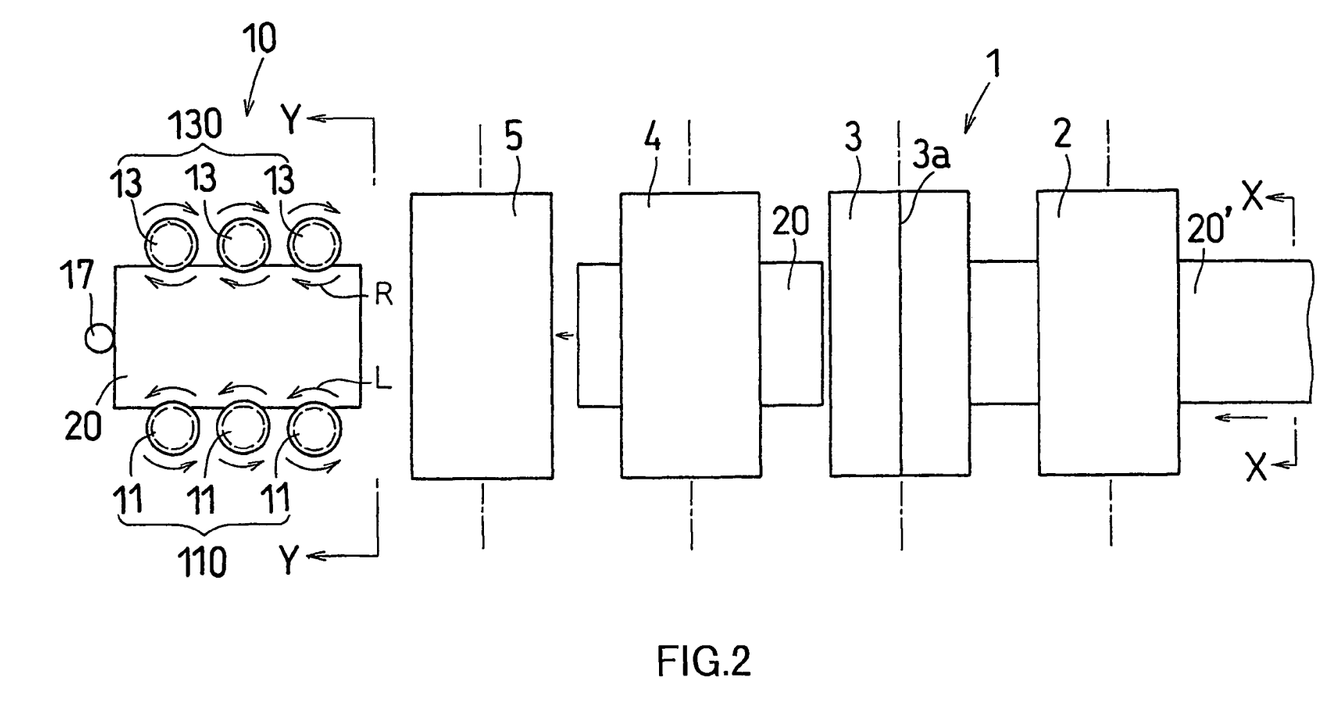
FIG. 2 is a plane view showing the stacker.

FIGS. 1–2 and 3–5 show a stacker for stacking plate members according to an embodiment of the present invention. In FIGS. 1 and 2, the reference numerals 1 and 10 denote a flying shear and a stacker, respectively.

In this embodiment, the plate member 20 to be stacked by the stacker 10 is a metal member, or a corrugated inner fin made of aluminum or its alloy sheared by a flying shear 1. This inner fin 20 is a member to be disposed in a heat exchanging tube constituting a heat exchanger such as an evaporator for car air conditioners. In general, this kind of inner fin 20 has a length of 150 to 250 mm and a width of 20 to 70 mm. Thickness thereof is extremely small such as 0.15 mm or less.

As shown in FIGS. 1 and 2, the flying shear 1 is an apparatus for shearing a long plate member (i.e., inner fin member material 20') having a predetermined width and a predetermined cross-sectional shape formed by a forming apparatus (not shown) and continuously supplied at a predetermined rate from the forming apparatus into pieces (i.e., fin members 20) each having a predetermined length.

This flying shear 1 is equipped with a pair of upper and lower feeding rollers 2 and 2, a pair of upper and lower cutting rollers 3 and 3 and a pair of upper and lower forwarding rollers 4 and 4.

The aforementioned pair of upper and lower feeding rollers 2 and 2 are used to feed a long plate member 20' continuously supplied from the aforementioned forming apparatus to the cutting rollers 3 and 3.

The aforementioned pair of upper and lower cutting rollers 3 and 3 are used to cut the long plate member 20' fed from the feeding rollers 2 and 2 into plate members 20 each having a predetermined length. Each cutting roller 3 is equipped with a pair of cutting portions 3a and 3a for shearing the plate member 20'. The cutting portions 3a and 3a are formed on the peripheral surface of each cutting roller 3 at regular intervals in the circumferential direction, and the corresponding cutting portions 3a and 3a of the pair of cutting rollers 3 and 3 are engaged with each other to shear the long plate member 20'.

The aforementioned forwarding rollers 4 and 4 are used to forward the plate member 20 having a predetermined length cut by the cutting rollers 3 and 3 at a prescribed rate.

Figure 3:
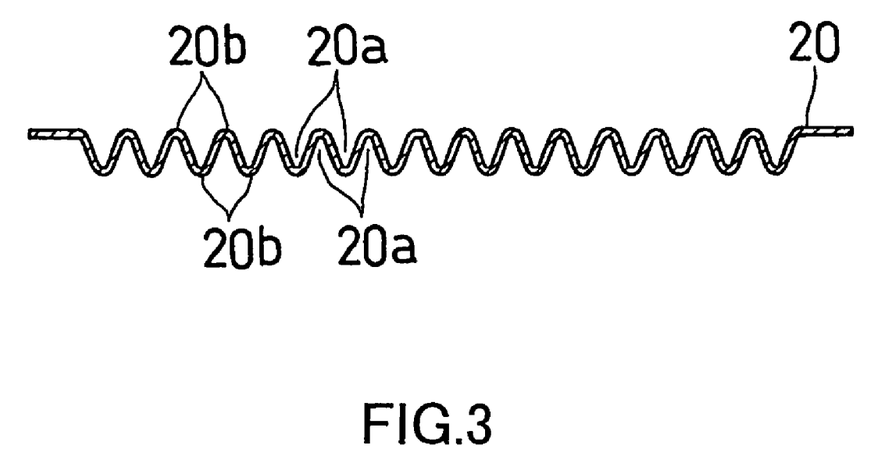
FIG. 3 is a cross-sectional view taken along the line X—X in FIG. 2.

The plate member 20' (inner fin material) is formed by the forming apparatus into the cross-sectional shape having a wavy middle portion and flat side edges as shown in FIG. 3. Accordingly, the plate member 20 has a plurality of dented portions 20a and protruded portions 20b alternatively formed on the both surfaces of the plate member 20 so as to extend in the longitudinal direction thereof.

Returning to FIG. 1, at the exit side of the flying shear 1, a pair of upper and lower transferring rollers 5 and 5 are provided. These rollers 5 and 5 are designed to transfer the plate member 20 to a stacker 10 while keeping the plate member 20 in an approximately horizontal position.

The stacker 10 is equipped with a platform 15 and plural pairs of right and left columnar guides 11 and 13.

Figures 4, 5:
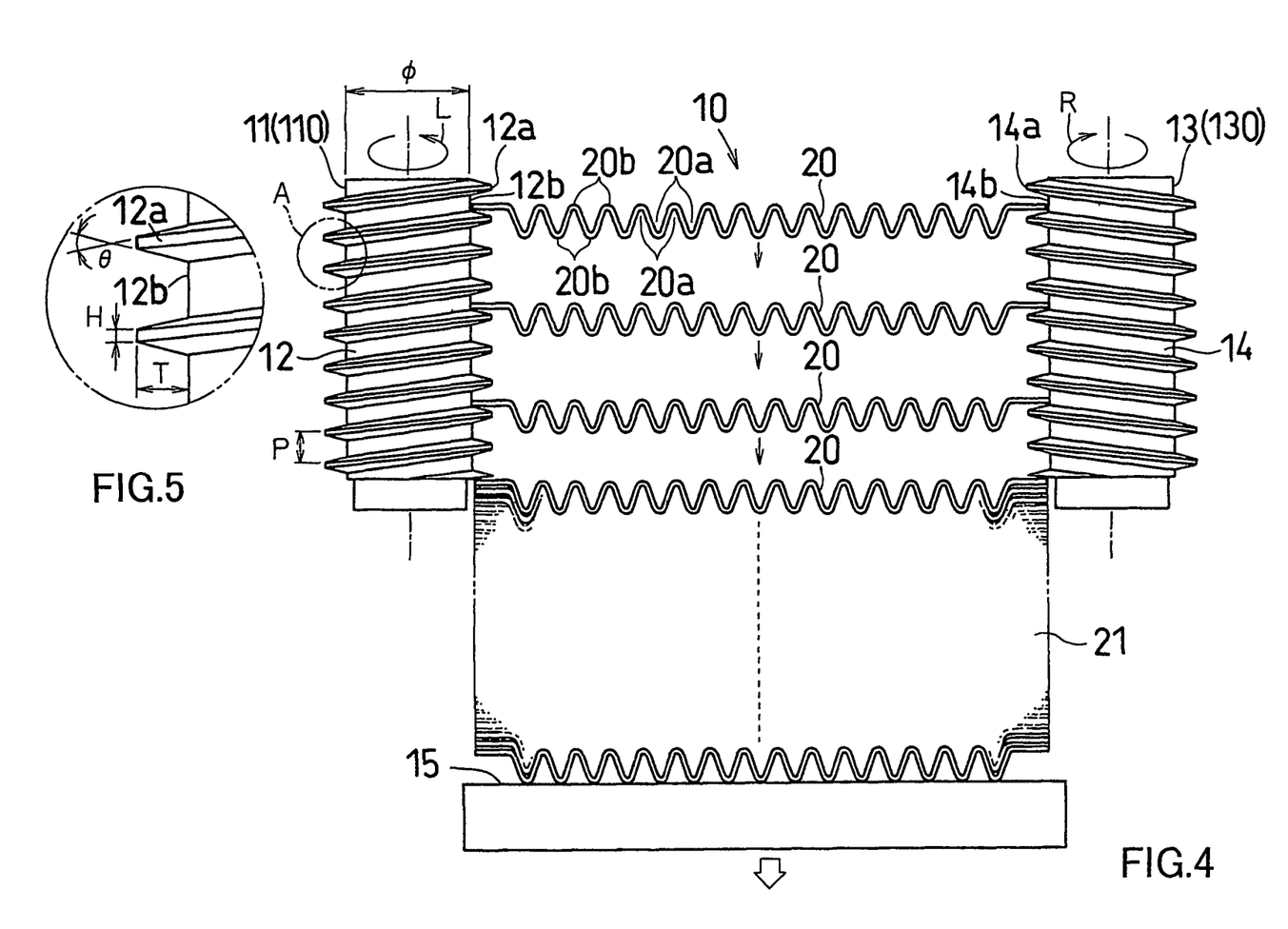
FIG. 4 is an enlarged front view showing the stacker as seen from the line Y—Y in FIG. 2.
FIG. 5 is an enlarged view of the portion A shown in FIG. 4.

The platform 15 is arranged in approximately parallel with the plate member 20 transferred by the transferring rollers 5 and as shown in FIGS. 1 and 4. In this embodiment, since the plate member 20 is transferred to the stacker 10 in a horizontal position, this platform 15 is disposed horizontally. On this platform 15, the plate members 20 transferred to the stacker 10 at a predetermined rate by the transferring rollers 5 and 5 are stacked.

The aforementioned plural pairs of guides 11 and 13 are arranged at right and left sides of the platform 15 as seen from the flying shear 1 at predetermined intervals along the transferring direction of the plate member 20. In this embodiment, since the plate member 20 is in a horizontal position, the plural pairs of guides 11 and 13 are arranged vertically. In this embodiment, three pairs of guides 11 and 13 are provided. The position of each guide 11 and 13 is fixed.

As shown in FIG. 4, each guide 11(13) has a columnar axial portion 12(14) which is round in cross-section and has a predetermined length. On the peripheral surface of this rotation axial portion 12(14), a ridge 12a(14a) is integrally formed in a spiral manner along the entire length of the axial portion 12(14). Thus, a groove 12b(14b) is spirally formed along the entire length of the ridge 12a(14a). The ridge 12a(14a) is formed intoatrapezoid shape in cross-section, more specifically, an isosceles trapezoid shape in cross-section. Accordingly, as shown in FIG. 5, the width H of the top portion of this ridge 12a(14a) is set to be smaller than the width of the basal end portion of the ridge 12a(14a). The top portion of the ridge 12a(14a) is formed to have a width H of, for example, 1.5 mm. It is preferable that the angle θ formed by the both sides of the ridge 12a(14a) falls within the range of 20° to 30°. The height T of the ridge 12a(14a) is set to, for example, 7 mm. The pitch P (see FIG. 4) of the ridge 12a(14a) is set to, for example, 10 mm. Furthermore, the diameter φ (see FIG. 4) of each axial portion 12(14) is set to, for example, 40 mm.

As shown in FIGS. 1 and 2, in this stacker 10, a barshaped stopper 17, which is round in cross-section and has a predetermined length, is disposed perpendicularly to a plane including the plate member 20. In this embodiment, since the plate member 20 is in a horizontal position, the stopper 17 is arranged vertically such that the upper end thereof is located at the level the same as or higher than the upper end of the guide 11(13) and that the lower end thereof is located at the level the same as or lower than the lower end of the guide 11(13). On the other hand, the platform 15 is disposed at the level the same as or lower than the lower end of the guide 11(13).

Each guide 11(13) is connected to a rotation driving apparatus (not shown), so that the guide 11(13) is rotated about the axis thereof in a prescribed direction.

In the following explanation, for convenience sake, the guides 11 located at the left side of the platform 15 and the guides 13 located at the right side thereof as seen from the plate member introducing side will be referred to as a 'left guide group 110' and a 'right guide group 130', respectively.

The ridge 12a of each guide 11 constituting the left guide group 110 spirals clockwise from the upper end toward the lower end as seen from the top. On the other hand, the ridge 14a of each guide 13 constituting the right guide group 130 spirals counterclockwise from the upper end toward the lower end as seen from the top.

Furthermore, each guide 11 of the left guide group 110 is rotated counterclockwise as seen from the top, i.e., in the direction that the plate member 20 is forwarded toward the stopper 17. In FIGS. 2 and 4, the arrow L denotes the rotational direction of each guide 11 constituting the left guide group 110. On the other hand, each guide 13 of the right guide group 130 is rotated clockwise as seen from the top, i.e., in the direction that the plate member 20 is forwarded toward the stopper 17. In FIGS. 2 and 4, the arrow R denotes the rotational direction of each guide 13 constituting the right guide group 130.

The platform 15 is connected to a lifting device (not shown), and moved downward, or in the same direction as the moving direction of the plate member 20 toward the platform 15, at the predetermined rate in accordance with the driving of the lifting device.

Next, the operation of the aforementioned stacker 10 will be explained.

A long belt-shaped plate member 20' having a predetermined configuration is formed by a forming apparatus. Then, this plate member 20' is continuously supplied to the flying shear 1 at a predetermined rate. Then, as shown in FIGS. 1 and 2, the supplied plate member 20' is introduced between the rotating feeding rollers 2 and 2 of the flying shear 1, so that the material 20' passes therebetween. Thereafter, the member 20' is forwarded toward the rotating cutting rollers 3 and 3 by the feeding rollers 2 and 2. The member 20' is sheared by the engaged pair of cutting portions 3a and 3a of the cutting rollers 3 and 3 into a plate member 20 having a predetermined length.

Subsequently, this plate member 20 passes through the rotating forwarding rollers 4 and 4 and the rotating transferring rollers 5 and 5 in this order. Then, this plate member 20 is transferred to the stacker 10 at a predetermined rate while keeping the horizontal state.

At a predetermined timing, as mentioned above, each guide 11 of the left guide group 110 is rotated in the direction L for forwarding the plate member 20 toward the stopper 17, while each guide 13 of the right guide group 130 is rotated in the direction R for forwarding the plate member 20 toward the stopper 17. Each guide 11 of the left guide group 110 and that of the right guide group 130 are rotated at the same rate.

As shown in FIG. 4, the plate member 20 transferred to the stacker 10 by the transferring rollers 5 and 5 is supported by and between the left guide group 110 and the right guide group 130 in a state that the left edge of the plate member 20 received by the groove 12b is supported by the ridge 12a while the right edge thereof received by the groove 14b is supported by the ridge 14a. In this state, the plate member 20 is disposed horizontally and positioned relative to the right-and-left direction with the right and left edges of the plate member 20 engaged with the right and left guide groups 110 and 130. This plate member 20 is transferred forward by receiving the rotational force of the left guides 11 of the left guide group 110 and that of the right guides 13 of the right guide group 130. Accordingly, the front edge of the plate member 20 is pressed against the stopper 17. By this pressing, the plate member 20 is positioned relative to the fore-and-aft direction thereof.

With this positioned state, in accordance with the rotation of the guides 11 and 13, the plate member 20 is guided by the grooves 12b and 14b downward toward the platform 15 at a predetermined rate. Finally, this plate member 20 is discharged from the lower ends of the guides 11 and 13 to be placed on the platform 15.

While the plate member 20 is being moved downward, another plate member 20 newly transferred to the stacker 10 by the transferring rollers 5 and 5 is supported by and between the left guide group 110 and the right guide group 130 in a state that the left edge of the plate member 20 received by the groove 12b is supported by the ridge 12a while the right edge thereof received by the groove 14b is supported by the ridge 14a. The plate member 20 is also guided by the grooves 12b and 14b downward toward the platform 15 at a predetermined rate in accordance with the rotation of the guides 11 and 13. Finally, this plate member 20 is discharged from the lower ends of the guides 11 and 13 and placed on the aforementioned plate member 20 on the platform 15.

Similarly, the following plate members 20 successively transferred from the transferring rollers 5 and 5 are supported by and between the left guide group 110 and the right guide group 130 in a state that the left edge of the plate member 20 received by the groove 12b is supported by the ridge 12a while the right edge thereof received by the groove 14b is supported by the ridge 14a. Then, these plate members 20 are guided downward by the grooves 12b and 14b toward the platform 15 at a predetermined rate in accordance with the rotation of the guides 11 and 13, and stacked on the platform 15.

By using this stacker 10, plate members 20 can be stacked at a very fast stacking rate, which in turn enables the flying shear 1 to increase the shearing speed. Furthermore, since a plurality of plate members 20 are stacked on the platform 15 one after another, the plate members 20 can be laminated in an aligned manner.

On the other hand, the platform 15 is moved downward at approximately the same rate as the stacking rate S of the plate members 20. The stacking rate S of the plate members 20 is given by the aforementioned formula (i). Accordingly, by setting the height position of the upper most plate member 20 to the height position of the lower end of each guide 11(13), the plate member 20 discharged from the lower end of each guide 11(13) will be placed on the upper most plate member 20 stacked on the platform 15 immediately after the discharge. As a result, the plate members 20 can be prevented from being deformed due to a shock at the time of stacking them, and therefore can be stacked without causing any deformation of the plate members 20.

In this embodiment, in the state that the plate members 20 are stacked on the platform 15, the upper most plate member 20 is in contact with the lower surfaces of the lower ends of the ridges 12a and 14a of the right and left guides 11 and 13, and pressed downward by them.

According to this stacker 10, the plate members 20 are stacked in a state that they are positioned relative to the fore-and-aft direction as well as the right-and-left direction. Accordingly, the plate members 20 can be stacked neatly.

Furthermore, the plate member 20 is moved downward in a state that the right and left edges of the plate member 20 are supported by the ridges 12a and 14a of the guides 11 and 13 of the right and left guide groups 110 and 130. Accordingly, even if the plate member 20 has a thin thickness such as 0.15 mm or less, the plate member 20 can be stacked without causing any deformation. In addition, since the plate members 20 are stacked by disposing one on another from the above, the plate members 20 can be stacked neatly without applying any lubricant on the surfaces of the plate members. Even in cases where the plate members 20 each having dented portions 20a and protruded portions 20b on both surfaces thereof are stacked, these plate members 20 can be stacked easily.

Furthermore, since the stopper 17 is disposed at the front side of the platform 15, the positioning of the plate member 20 relative to the fore-and-aft direction thereof can be performed with accuracy. Accordingly, plate members 20 can be stacked in perfect alignment.

Furthermore, since the width H of the top portion of the ridge 12a(14a) is set to be smaller than the width of the basal portion of the ridge, the side edges of the plate member 20 can be assuredly received by the grooves 12b and 14b of the guides 11 and 13.

Furthermore, since plate members 20 are transferred to the stacker 10 by the transferring rollers 5 and 5, the plate members 20 can be supplied to the stacker 1 with great efficiency.

Even if the operation of the flying shear 1 stops or the shearing speed changes, the stacking operation of the stacker 10 would not be adversely affected by the above.

Although the present invention is explained with referring to the aforementioned embodiment, the present invention is not limited to the aforementioned embodiment but may be changed variously.

For example, although the stacker 10 is disposed adjacent to the flying shear 1 in the aforementioned embodiment, it may be disposed adjacent to a press punching apparatus or the like.

In the aforementioned embodiment, the stacker 10 is provided with three pairs of guides 11 and 13. However, the stacker according to the present invention may be provided with a plurality of pairs of guides or only one pair of guides.

In the aforementioned embodiment, the plate member 20 is transferred to the stacker in a horizontal position. However, in the present invention, the plate member 20 may be transferred to the stacker in a vertical position. In the latter case, the platform 15 is disposed vertically, while the pair of guides 11 and 13 are disposed horizontally.

Furthermore, in the present invention, the plate member 20 may be a member other than the aforementioned inner fin.

With the stacker according to the first aspect of the present invention, since the plate member is moved toward the platform by the pair of rotating guides with both side edges of the plate member engaged with the grooves of the pair of guides, the plate member can be positioned relative to the right-and-left direction thereof at the time of stacking the plate members. Furthermore, since the plate member is moved toward the platform in a state that the side edges of the plate member are supported by the ridges of the guides, not only a thick plate member but also a thin plate member can be moved toward the platform without causing any deformation thereof. Moreover, even in the middle of moving the plate member, a newly transferred plate member can be moved toward the platform. Accordingly, a plurality of plate members can be stacked at a high speed.

Furthermore, in the aforementioned stacker, in cases where a stopper which stops the forward movement of a plate member by coming in contact with the front edge of the plate member is provided, the plate members can be stacked in perfect alignment.

According to the second aspect of the present invention, stacked plate members in perfect alignment can be obtained.

With the method of stacking plate members according to the third aspect of the present invention, plate members can be moved toward a platform at a high speed without causing any deformation.

According to the fourth aspect of the present invention, stacked plate members in perfect alignment can be obtained.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

INDUSTRIAL APPLICABILITY

A stacker for plate members according to the first aspect of the present invention can be used as a stacker for stacking plate-shaped pieces sheared by a flying shear, or plate-shaped blanks punched by a punching apparatus. A method of stacking plate members according to the third aspect of the present invention can be used as a method of stacking plate-shaped pieces sheared by a flying shear or plate-shaped blanks punched by a punching apparatus.

What is claimed is:

1. A stacker for plate members, comprising:
   a flying shear;
   a transferring apparatus positioned at an exit side of the flying shear and configured to receive a plate member sheared by the flying shear;
   a guiding device configured to transfer the plate member, which is received from the transferring apparatus, at a transferring speed along a transferring direction; and
   a platform positioned to receive the plate member from the guiding device and configured to move in the transferring direction according to the transferring speed.

2. The stacker for plate members according to claim 1, wherein the transferring speed is relative to a stacking rate satisfying the following expression:

$$S = N \times d,$$

where S is the stacking rate, N is the number of the plate members to be stacked per unit time, and d is a thickness of each of the plate members.

3. The stacker for plate members according to claim 1, wherein the plate member is 0.15 mm or less in thickness.

4. The stacker for plate members according to claim 1, wherein the plate member has at least one of a dented portion and a protruded portion on at least one side of the plate member.

5. Stacked plate members stacked by the stacker according to claim 1.

6. The stacker for plate members according to claim 1, wherein the guiding device comprises a plurality of guides positioned adjacent to the platform along the transferring direction.

7. The stacker for plate members according to claim 6, wherein each of the plurality of guides is configured to rotate on a rotational axis and has a spiral ridge and groove around the rotational axis, and the grooves are configured to engage the plate member therein.

8. The stacker for plate members according to claim 7, further comprising a stopper provided at a front side of the platform to align the plate members.

9. The stacker for plate members according to claim 7, wherein a width of a top portion of the spiral ridge is set to be smaller than a width of a basal portion of the spiral ridge.

10. The stacker for plate members according to claim 7, wherein at least one of the plurality of guides has a reverse spiral ridge, and
    wherein at least one of each of the plurality of guides with the spiral ridge and with the reverse spiral ridge rotate at a predetermined rate relative to each other to move the plate member forward.

11. The stacker for plate members according to claim 10, further comprising a stopper provided at a front side of the platform to align the plate members.

12. The stacker for plate members according to claim 10, wherein a width of a top portion of the reverse spiral ridge is set to be smaller than a width of a basal portion of the reverse spiral ridge.

13. A method of stacking plate members, comprising:
    shearing a plate member by a flying shear;
    moving the plate member, which is sheared by the flying shear, to a guiding device by a transferring apparatus positioned at an exit side of the flying shear;
    transferring the plate member by the guiding device at a transferring speed along a transferring direction;
    providing a platform to receive the plate member from the guiding device; and
    moving the platform in the transferring direction according to the transferring speed.

14. The method of stacking plate members according to claim 13, wherein the transferring speed is relative to a stacking rate satisfying the following expression:

$$S = N \times d,$$

where S is the stacking rate, N is the number of the plate members to be stacked per unit time, and d is a thickness of each of the plate members.

15. The method of stacking plate members according to claim 13, wherein the plate member is 0.15 mm or less in thickness.

16. The method of stacking plate members according to claim 13, wherein the plate member has at least one of a dented portion and a protruded portion on at least one side of the plate member.

17. Stacked plate members stacked by the method of stacking plate members according to claim 13.

18. The method of stacking plate members according to claim 13, wherein the guiding device comprises a plurality of guides positioned adjacent to the platform along the transferring direction.

19. The method of stacking plate members according to claim 18, wherein each of the plurality of guides rotates on a rotational axis and has a spiral ridge and groove around the rotational axis, and the grooves are configured to engage the plate member therein.

20. The method of stacking plate members according to claim 19, wherein the stacker further comprises a stopper provided at a front side of the platform to align the plate members.

21. The method of stacking plate members according to claim 19, wherein a width of a top portion of the spiral ridge is set to be smaller than a width of a basal portion of the spiral ridge.

22. The method of stacking plate members according to claim 19,
   wherein at least one of the plurality of guides has a reverse spiral ridge, and
   wherein at least one of each of the plurality of guides with the spiral ridge and with the reverse spiral ridge rotate at a predetermined rate relative to each other to move the plate member forward.

23. The method of stacking plate members according to claim 22, wherein the stacker further comprises a stopper provided at a front side of the platform to align the plate members.

24. The method of stacking plate members according to claim 22, wherein a width of a top portion of the reverse spiral ridge is set to be smaller than a width of a basal portion of the reverse spiral ridge.

* * * * *